United States Patent
Tinkler et al.

(10) Patent No.: US 7,180,046 B2
(45) Date of Patent: Feb. 20, 2007

(54) FOCAL PLANE ARRAY WITH ON-CHIP LOW-VOLTAGE DIFFERENTIAL SERIAL INTERFACE

(75) Inventors: Rosanne H Tinkler, Lexington, MA (US); Neal R Butler, Acton, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 263 days.

(21) Appl. No.: 10/903,565

(22) Filed: Jul. 30, 2004

(65) Prior Publication Data

US 2006/0022119 A1 Feb. 2, 2006

(51) Int. Cl.
H01J 40/14 (2006.01)
(52) U.S. Cl. .................................. 250/214 R; 710/52
(58) Field of Classification Search ............ 250/208.1, 250/214 R, 214 DC; 375/219–220, 257; 341/100–101; 710/52, 58, 71
See application file for complete search history.

(56) References Cited

U.S. PATENT DOCUMENTS 5,729,016 A 3/1998 Klapper et al.
6,249,002 B1 6/2001 Butler
6,515,285 B1 2/2003 Marshall et al.
6,650,141 B2 * 11/2003 Agrawal et al. .............. 326/41
2002/0022938 A1 2/2002 Butler

OTHER PUBLICATIONS

"Serializing High-Speed Parallel Buses to Extend Their Operational Lengh", Mar. 12, 1999, pp. 1-25, Cypress Semiconductor Corporation, CA.
Huq, Syed, et al., "An Overview of LVDS Technology", www.national.com, Jul. 1998, pp. 1-6, AN-971, National Semiconductor Corporation.
Breiter, Rainer, "HuntIR: A Family of Thermal Imagers for Reconnaissance and Targeting Applications", pp. 1-6, AIM AEG Infrarot-Module GmbH., 2004.
Monacos, S. et al., "Design of an Event-Driven, Random-Access, Windowing CCD-Based Camera", IPN Progress Report 42-155, Nov. 15, 2003, pp. 1-24.
Breiter, Rainer et al., "AIM image processing electronics for FPA IR detection modules", www.aim.ir.com, pp. 1-2., 2003.
"SIDECAR ASIC", www.rsc.rockwell.com, pp. 1-2, Rockwell Scientific., 2004.

* cited by examiner

Primary Examiner—Kevin Pyo
(74) Attorney, Agent, or Firm—Maine & Ausmus

(57) ABSTRACT

A high-speed serial interface for focal plane arrays (FPAs), such as microbolometer and cooled FPAs, is disclosed. The interface uses a serial low-voltage differential signal that is substantially unsusceptible to digital crosstalk and EMI, and provides power dissipation that is signal-independent.

18 Claims, 9 Drawing Sheets

FOCAL PLANE ARRAY WITH ON-CHIP LOW-VOLTAGE DIFFERENTIAL SERIAL INTERFACE

FIELD OF THE INVENTION

The invention relates to interface techniques for focal plane arrays, and more particularly, to a focal plane array having an on-chip low-voltage differential serial data link.

BACKGROUND OF THE INVENTION

Focal plane arrays (FPAs) can be implemented with various known technology, such as charge-coupled devices, quantum well infrared photodetectors (QWIPs), or other such imaging devices. FPAs can be cooled, where they are configured with a Dewar cold finger or other cooling mechanism. Alternatively, an FPA can be uncooled (a common implementation is a microbolometer).

In any such cases, FPAs have either a digital or analog output. FPAs with digital outputs typically employ parallel CMOS busses to deliver the pixel data coming from the FPA to the array output, where the pixel data can then be processed as necessary (e.g., image formation and artifact removal). The same parallel CMOS bus structure is also used to deliver pertinent information to the FPA, such as pixel clocks, frame synchronization, and other control signals. There are a number of problems associated with such conventional interface structures.

For example, a parallel CMOS interface structure requires multiple digital I/Os or other such interfaces to the FPA, which adds complexity to the packaging and manufacturing process. Also, sensitive signals on the parallel CMOS interface are susceptible to digital crosstalk, electromagnetic interference (EMI), and other interferences. In addition, power dissipation associated with the parallel CMOS interface is signal dependent. As such, the power dissipation can vary substantially, thereby requiring additional design complexity as to power sources and management, as well as heat dissipation.

What is needed, therefore, are techniques for interfacing with FPAs. The interface techniques should be substantially unsusceptible to digital crosstalk and EMI, and should provide power dissipation that is signal-independent.

SUMMARY OF THE INVENTION

One embodiment of the present invention provides a focal plane array chip device with an on-chip serial low-voltage differential signal (LVDS) interface. The device includes an LVDS receiver that is adapted to receive incoming control data in LVDS format from an external circuit, and to convert the control data to appropriate levels for subsequent use on the chip. A clock recovery circuit is adapted to recover a clock signal associated with the control data, so that the control data can be synchronized with an internal clock. A deserializer module is adapted to deserialize level shifted control data output by the LVDS receiver using the recovered clock signal, and a command/decoder module is adapted to receive the deserialized data so that the data can be used on-chip as needed.

The chip device may further include a focal plane array that is adapted to receive light signals incident on the array so as to generate a collection of x by y pixel data. The chip device may further include analog processing circuitry that is adapted to amplify and sample the pixel data to provide its analog representation, and an n-bit analog-to-digital converter that is adapted to convert the analog representation of the pixel data to its digital equivalent. The chip device may further include a serializer module that is adapted to serialize digital pixel data (e.g., generated by an on-chip focal plane array). The chip device may further include a variable delay module that is adapted receive serialized digitized pixel data, and to synchronize that data with an external receiving circuit. The chip device may further include an LVDS driver that is adapted to receive synchronized, serialized digital pixel data, perform any necessary conversion to LVDS format, and to drive the synchronized, serialized digital pixel data in LVDS format to the external receiving circuit.

Another embodiment of the present invention provides a focal plane array chip device with an on-chip serial low-voltage differential signal (LVDS) interface. The device includes a focal plane array that is adapted to receive light signals incident on the array so as to generate a collection of x by y pixel data. A serializer module is adapted to serialize a digital representation of the pixel data, and a variable delay module is adapted to synchronize the serialized digital pixel data with an external receiving circuit. An LVDS driver is adapted to convert the synchronized, serialized digital pixel data to LVDS format, and to drive the synchronized, serialized digital pixel data in LVDS format to the external receiving circuit.

The chip device may further include analog processing circuitry that is adapted to amplify and sample the pixel data to provide its analog representation, and an n-bit analog-to-digital converter that is adapted to convert the analog representation of the pixel data to the digital representation. The chip device may further include vertical address registers and horizontal address registers that allow pixel data to be selectively accessed. The chip device may further include an LVDS receiver that is adapted to receive incoming control data in LVDS format from an external circuit, and to convert the control data to appropriate levels for subsequent use on the chip. The chip device may further include a clock recovery circuit adapted to recover a clock signal associated with control data received from an external circuit, so as to synchronize the control data with an internal clock. The chip device may further include a deserializer module that is adapted to deserialize the control data received from the external circuit, using the recovered clock signal. The chip device may further include a command/decoder module that is adapted to receive deserialized control data so that the data can be used on-chip as needed.

The chip device in any such embodiments can be implemented, for example, as an application specific integrated circuit chip. In one particular embodiment, the LVDS format includes a differential signal having levels between about 0.2 VDC and 2.0 VDC.

Another embodiment of the present invention provides a method for interfacing a focal plane array chip using an on-chip serial low-voltage differential signal (LVDS) interface. The method includes receiving incoming control data in LVDS format from off-chip, and converting the control data to appropriate levels for subsequent use on the chip. The method continues with recovering a clock signal associated with the control data (so as to synchronize the control data with an internal clock), and then deserializing the control data using the recovered clock signal, so that the data is available for on-chip use (e.g., control functions).

In one such embodiment, the method further includes receiving light signals incident on an on-chip focal plane array so as to generate a collection of x by y pixel data. Here, the method further includes serializing a digital representation of the pixel data, and synchronizing the serialized digital pixel data with an off-chip receiving circuit. The method proceeds with converting the synchronized, serialized digital pixel data to LVDS format, for transmission to the off-chip circuit.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Figure 1:
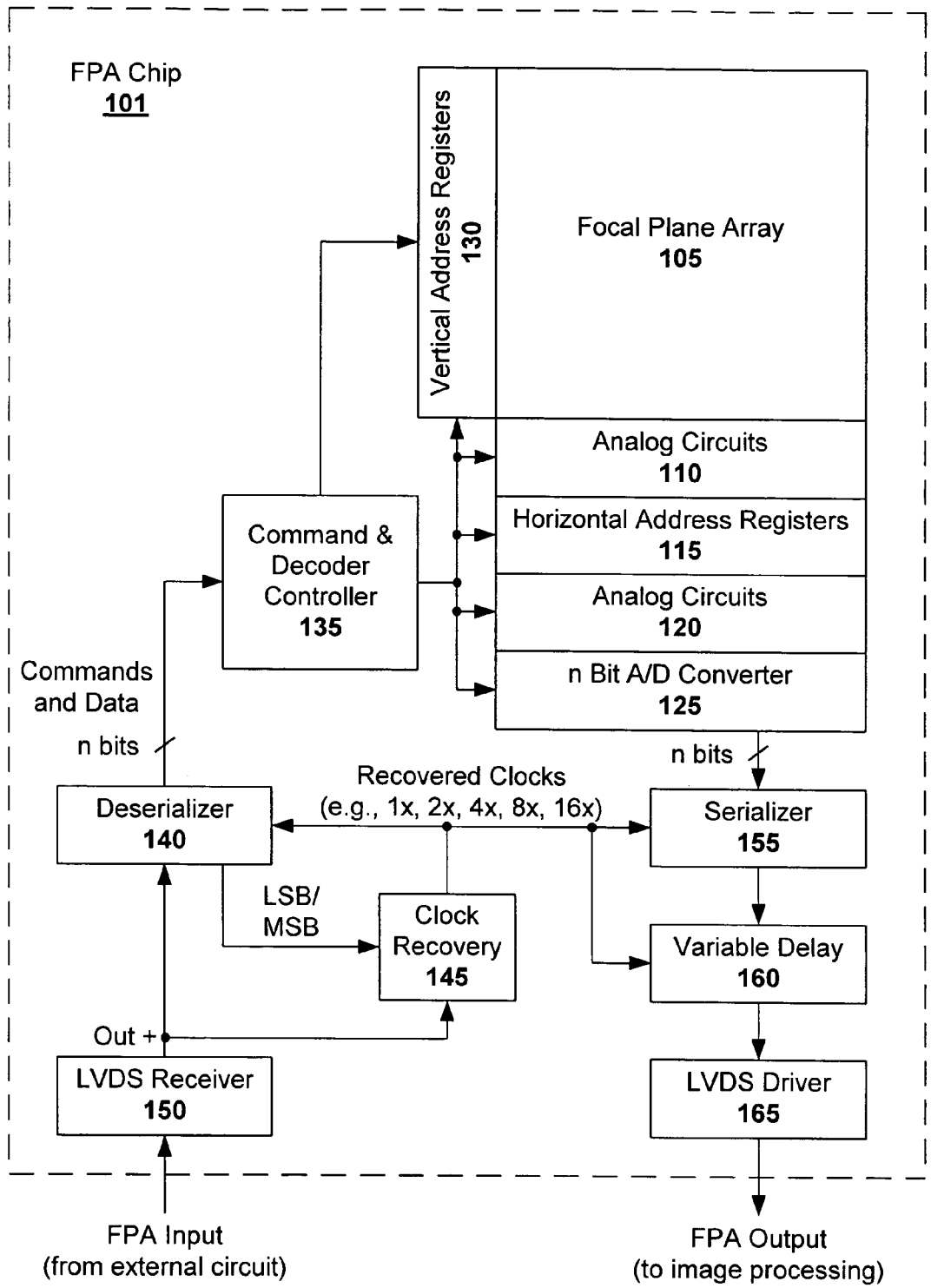
FIG. 1 is a block diagram illustrating a focal plane array chip configured with a low-voltage differential signal interface in accordance with one embodiment of the present invention.

Embodiments of the present invention provide a high-speed serial interface for focal plane arrays (FPAs). The interface uses a low-voltage differential signal that is substantially unsusceptible to digital crosstalk and EMI, and provides power dissipation that is signal-independent. In addition, the interface can be implemented "on-chip" with the FPA, so that a single FPA chip is provided having on-chip A/D conversion and a high-speed serial interface.

General Overview

There are two main functions associated with an FPA interface. The first is to deliver any pertinent control information to the focal plane, such as pixel clocks, frame synchronization, and other control signals. The second is to deliver the data representing the imaged scene from the FPA to the image processing circuitry. Unlike conventional interface techniques, which generally use a parallel interface, the present invention uses a serial interface to provide these functions, such a as low-voltage differential signaling (LVDS) serial format In general, LVDS is a low noise, low power, low amplitude protocol for high-speed (e.g., gigabits per second) data transmission. The LVDS protocol uses a dual conductor system, with each conductor running about 180 degrees of each other. Such differential signalling enables noise to be readily filtered. With regular I/O signaling, power dissipation is dependent on the actual voltage level of the transmitted signal. In particular, the voltage level of conventional I/O signals (e.g., parallel CMOS or non-differential serial data) is typically attenuated over long wire distances (longer wires have increased resistance, which lowers the transmitted voltage). This attenuation must be compensated for, which translates to increased power dissipation. In contrast, LVDS distinguishes transmitted data only by positive and negative voltage values, not the voltage levels. In addition, low-voltage (e.g., 1.5 or 3.3 VDC) supplies can be used as opposed to typical supplies (e.g., 5 VDC). Therefore, the LVDS protocol allows data to travel over greater conductor lengths while maintaining a robust signal and consistent power dissipation.

In any event, incoming control information can be sent to the FPA from an external circuit, such as a field programmable gate array (FPGA), in a serial format (e.g., LVDS or other suitable serial protocol). The incoming control information is received by the focal plane array chip, and converted to the appropriate levels (e.g., CMOS). The clock signal embedded in the control information is then recovered, so that the external signals can be synchronized with the internal clock of the focal plane array chip. The recovered clock signal is then used to latch the incoming stream of control information, and to deserialize it. The deserialized data can then be sent anywhere on the chip it is needed (e.g., to on-chip digital-to-analog converters) or to any other circuits the focal plane array may require.

In the outgoing interface direction, light signals (e.g., infrared) incident on the focal plane array cause a collection of x by y pixel data to be generated. The signal from each pixel can then be appropriately processed (e.g., amplified and sampled by analog circuits) on a row by row basis. The analog representation of the detected light signal collected by each pixel can then be converted into its digital equivalent with a desired level of accuracy. The digital pixel data is then serialized, such that serialized data is synchronized with the external receiving circuit (e.g., FPGA). The serialized, appropriately phased data stream is converted to an LVDS or other suitable format for transmission to the external receiving circuit.

System Architecture

FIG. 1 is a block diagram illustrating a focal plane array chip configured with a low-voltage differential signal interface in accordance with one embodiment of the present invention. As can be seen, FPA chip 101 includes a serial I/O that employs the LVDS protocol. Other suitable serial protocols can be used here as well, as will be apparent in light of this disclosure.

The chip 101 includes an FPA 105, analog circuits 110 and 120, horizontal address registers 115, vertical address registers 130, a command and decoder controller 135, a deserializer 140, a serializer 155, a clock recovery module 145, a variable delay module 160, an LVDS receiver 150, and an LVDS driver 165. The FPA chip 101 can be implemented, for example, as an application specific integrated circuit (ASIC) or other purpose built semiconductor chip.

In operation, FPA input (e.g., control information such as pixel clocks, frame synchronization, and other control signals) is received in standard LVDS format by the FPA chip 101 from an external circuit (e.g., FPGA or other control circuit). The LVDS receiver 150 receives the FPA input signal, and converts that signal to the appropriate levels. In one particular embodiment, the LVDS receiver 150 is a high-speed amplifier that will convert the differential FPA input signal into a full-scale digital signal having CMOS levels. Alternatively, a conventional or custom level shifter could be employed to carry-out the function of the LVDS receiver 150. The level adjusted signal of the LVDS receiver 150 (designated Out + here) is provided to the deserializer 140 and the clock recovery 145.

The FPA input data is sent with a clock signal embedded in it, so the clock can be recovered from the data in order for the chip 101 circuitry to operate synchronously with the external circuitry that sent the data. The clock recovery circuit 145 is employed for this purpose. In particular, the clock recovery circuit 145 receives the Out + signal (which is the level adjusted version of the FPA input) from the LVDS receiver 150, and synchronizes the internal chip clock to the detected external clock signal embedded in the Out + signal. In one embodiment, the clock recovery circuit 145 uses a phase locked loop (PLL) to synchronize the external clock signal with the internal clock signal. However, numerous conventional or custom clock recovery techniques can be employed by clock recovery circuit 145, as will be apparent in light of this disclosure.

The recovered clock signal (and derivatives thereof, such as 2×, 4×, and 8×) can then be used to latch the data stream provided by the LVDS receiver 150, and deserialize it. In this embodiment, deserializer 140 is configured to carry-out this function. In one particular case, deserializer 140 latches the Out + data into a parallel register, and onto a n-bit parallel data bus (e.g., 16-bit bus). Any number of conventional or custom techniques for serializing data can be used here. The least significant bit (LSB) and most significant bit (MSB) data are provided to aid in the clock recovery process. The n-bit parallel data bus communicatively couples the parallel output of the deserializer 140 to the command and decoder controller 135.

The controller 135 is configured to control the focal plane array 105, and to send command data (included in the FPA input) anywhere on the FPA chip 101 as needed, as is conventionally done. For instance, the controller 135 can load command data into one or more digital-to-analog converters (DACs) included in the analog circuits 120 so that the analog equivalent signals can be used by the FPA chip 101, such as a specific pixel readout command signal to the horizontal and vertical address registers 115 and 130. Other command signals can also be used here (e.g., for detector biasing or automatic gain control), as will be apparent in light of this disclosure.

With regard to generation of the FPA output, light signals such as infrared (IR) or other detectable spectra incident on the focal plane array 105 cause a collection of x by y pixel data to be generated. In one particular embodiment, the focal plane array 105 is an array of quantum well photodetectors (QWIPs). Alternatively, the array 105 could be made up of charge-coupled devices. Alternatively, the array 105 could be a microbolometer array. Any number of known focal plane array technologies can be used here to implement the array 105. In addition, the array 105 may be cooled or uncooled, depending on the particulars of the application. Example applications include military (e.g., night vision and targeting systems) and commercial (e.g., IR cameras for firefighters and police).

The focal plane array 105 is addressed by way of shift registers as is conventionally done, and in particular by horizontal address register 115 and vertical address register 130. The conventional register scheme enables individual readout of the data from each pixel included in the array 105. The data signal from each pixel is appropriately amplified and sampled by the analog circuits 110 on a row by row basis. Conventional or custom amplification and sample and hold circuits can be used to implement the function of analog circuits 110.

An analog representation of the pixel data captured by analog circuits 110 is then converted into its digital data equivalent. In particular, the n bit A/D converter 125 converts the analog representation of the detected light signal collected by each pixel into a digital data format with n bits of accuracy (e.g., 8 or more bits). Any conventional A/D conversion techniques can be employed here. Note that analog circuits 120 may further include filtering and dithering circuitry to prepare the analog equivalent as necessary for the A/D conversion process.

The digital output of the A/D converter 125 is converted into a serial format by the serializer 155. Any conventional serializing techniques can be used here. Note that the serializer 155 is controlled by the same clock signals (from clock recovery 145) that were used to read the FPA input data into the chip 101. This configuration guarantees frequency lock.

A mechanism is also provided that enables the serialized data output by the serializer 155 to be synchronized with the external receiving circuit (e.g., FPGA). In particular, the variable delay stage 160 allows the serialized data output to be moved in phase such that it can be correctly received by the external chip. Note that the variable delay 160 also employs recovered clock signals from the clock recovery circuit 145. The variable delay 160 can be set, for example, with a standard calibration signal at chip 101 startup.

The serialized, properly-phased data stream is then converted to LVDS levels by the LVDS driver 165. Note that the driver 165 may also be configured to convert the serialized data stream to a differential data stream, if the stream is not already in differential form (e.g., based on operation of the serializer 155). Regardless of where the serialized data stream is converted to a differential signal, the driver 165 is capable of driving the differential signals through the external load and at LVDS levels or other suitable levels.

FIGS. 2a–2f are block diagrams illustrating component details of a low-voltage differential signal interface configured in accordance with embodiments of the present invention. As can be seen, each of the components is discussed in the context of FIG. 1. Note, however, that the principles of the present invention can be implemented using a number of different configurations, and is not intended to be limited to any one such embodiment.

Figure 2A:
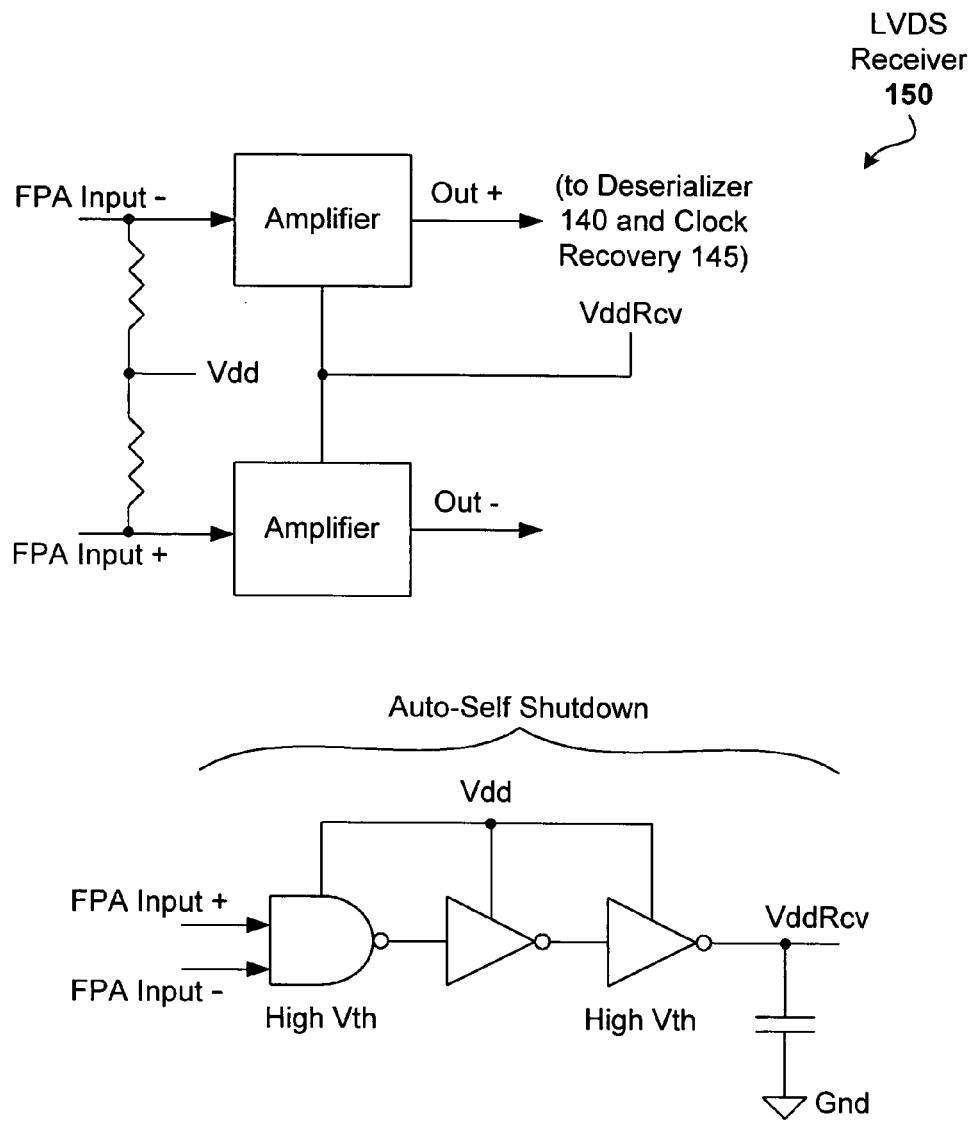
FIGS. 2a–2f are block diagrams illustrating component details of a low-voltage differential signal interface configured in accordance with embodiments of the present invention.

FIG. 2a illustrates one embodiment of the LVDS receiver 150. Each of the complementary signals of the differential FPA input (FPA input + and FPA input –) signals are provided to an amplifier to shift the levels of the signals as desired (e.g., from LVDS to CMOS levels). The positive output (Out +) is provided to the deserializer 140 and clock recovery 145. The negative output (Out –) is optional, and is unused in this particular embodiment.

As can be seen, this particular embodiment of the LVDS receiver 150 is configured with an auto-self shutdown feature. In this example, if both the FPA input + and FPA input – are high (such as when the external circuit coupled to the FPA input is in a high impedance output or tri-state mode), then the receiver enable line (VddRcv) is set to low, thereby automatically shutting down or otherwise disabling the LVDS receiver 150. This enable signal can be used to enable/disable other components of the interface, as will be apparent in light of this disclosure.

Figure 2B:
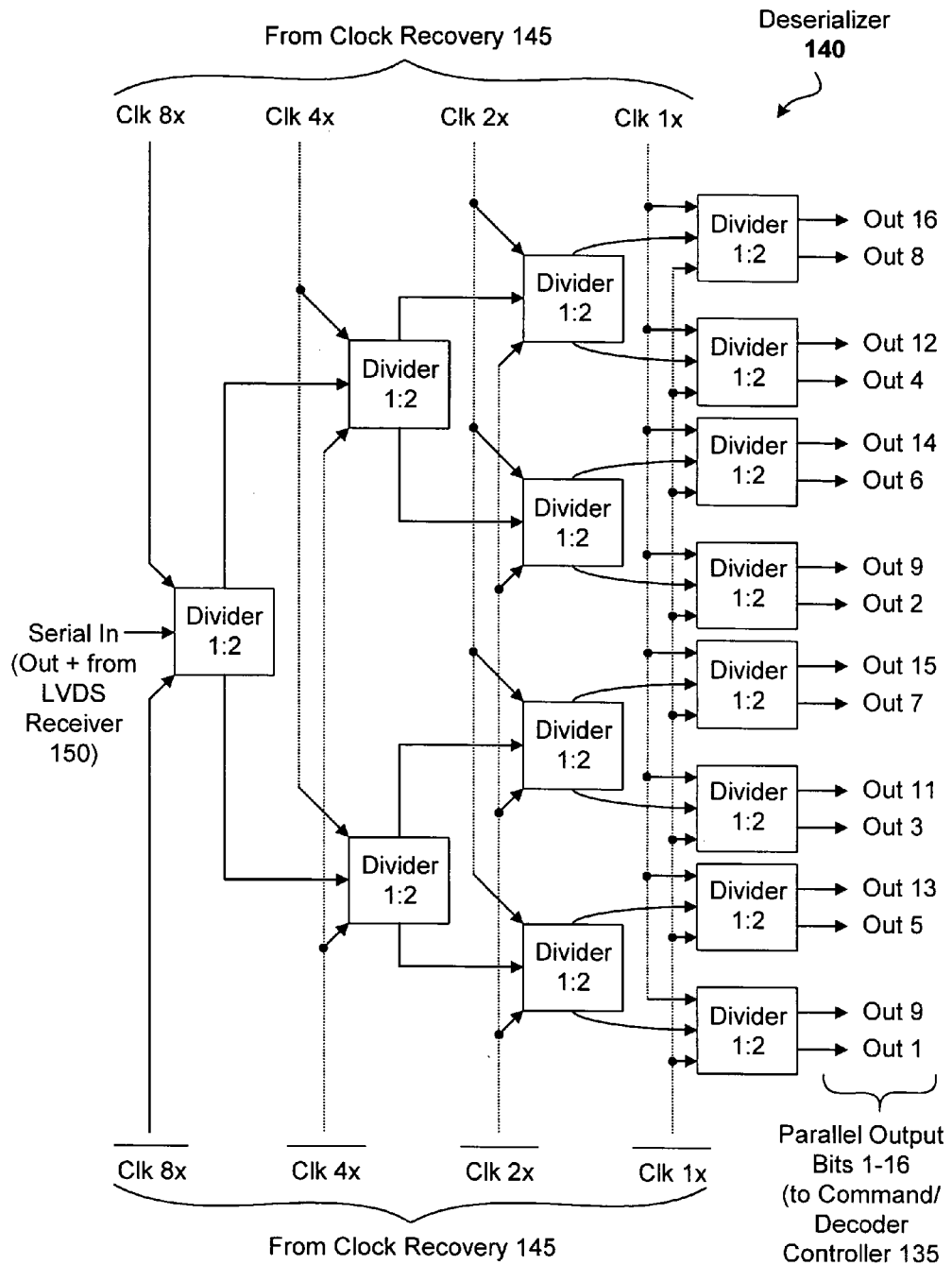

FIG. 2b illustrates one embodiment of the deserializer 140. As can be seen, a number of staged clock divider modules (1:2) are employed to convert the serial input into a 16-bit parallel output. The recovered differential clock signals 8×, 4×, 2×, and 1× from the clock recovery circuit 145 are each used to clock a corresponding one of the four stages of the deserialization process. Each of the clock divider modules is adapted to receive the + and – signals of the corresponding differential clock for that stage, and the input to be deserialized. The two outputs of each clock divider module provide the next stage with the inputs to be deserialized. The 1:2 divider modules can be implemented with conventional technology.

Figure 2C:
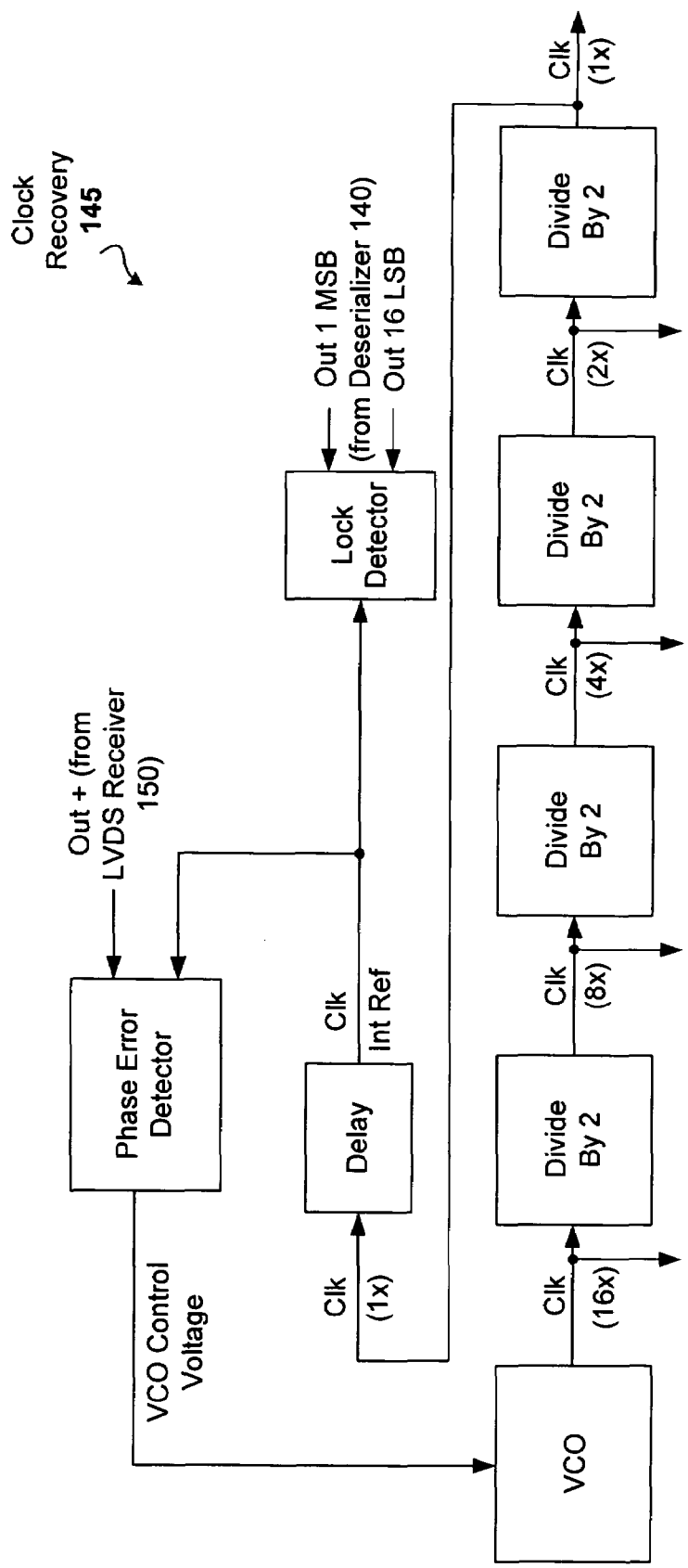

FIG. 2c illustrates one embodiment of the clock recovery circuit 145. Here, a PLL clock recovery scheme is used. The phase error detector compares the phase of the Out + signal from the LVDS receiver 150 with the phase of the internal reference clock signal (Clk Int Ref). The output of the phase error detector (VCO Control Voltage) is provided to the voltage controlled oscillator (VCO) input. The VCO output is coupled to the feedback loop of the PLL, which includes four divide by 2 modules. The recovered clock signals 16×, 8×, 4×, 2×, and 1× are shown at the respective outputs of each module. Note that complementary clock signals can be provided as well, thereby providing differential clock signals.

For example, the − clock signals can be generated by providing each of the + clock signals (e.g., 16×, 8×, 4×, 2×, and 1×) to respective inverters. The +clock signals can be provided to a non-inverting buffer. The lock detector module receives the internal reference clock signal and the MSB and LSB from the deserializer 140, and indicates a lock condition. Each of the modules can be implemented with conventional technology. Alternatively, a differential VCO can be used in conjunction with differential divide by 2 modules that each output + and − clock signals.

Figure 2D:
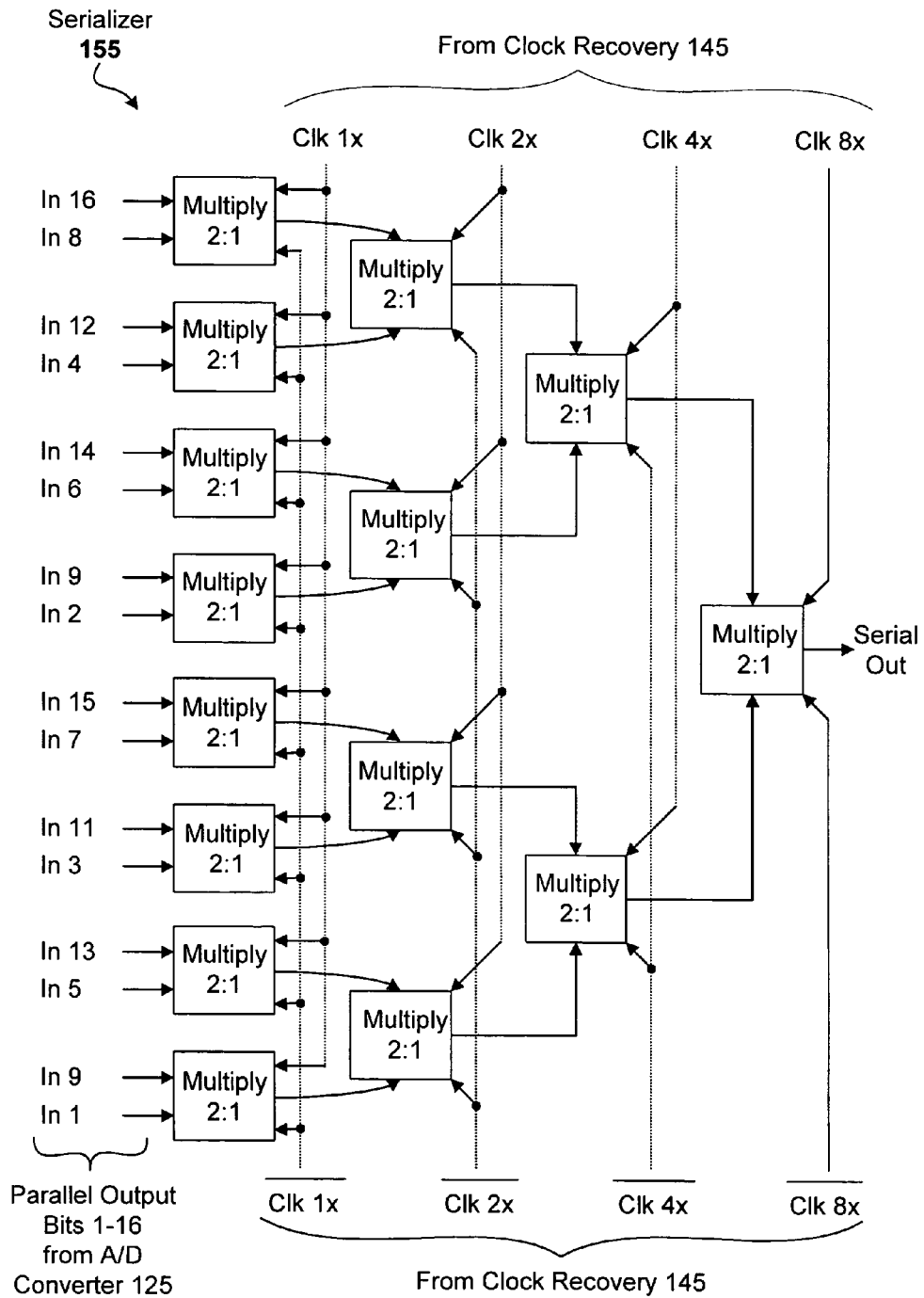

FIG. 2d illustrates one embodiment of the serializer 155. As can be seen, a number of staged clock multiplier modules (2:1) are employed to convert the 16-bit parallel input into a serial output. The recovered differential clock signals 1×, 2×, 4×, and 8× from the clock recovery circuit 145 are each used to clock a corresponding one of the four stages of the serialization process. Each of the clock multiplier modules is adapted to receive the + and − signals of the corresponding differential clock for that stage, and the input to be serialized. The output of each clock multiplier module provides the next stage with the inputs to be serialized. The 2:1 multiplier modules can be implemented with conventional technology.

Figure 2E:
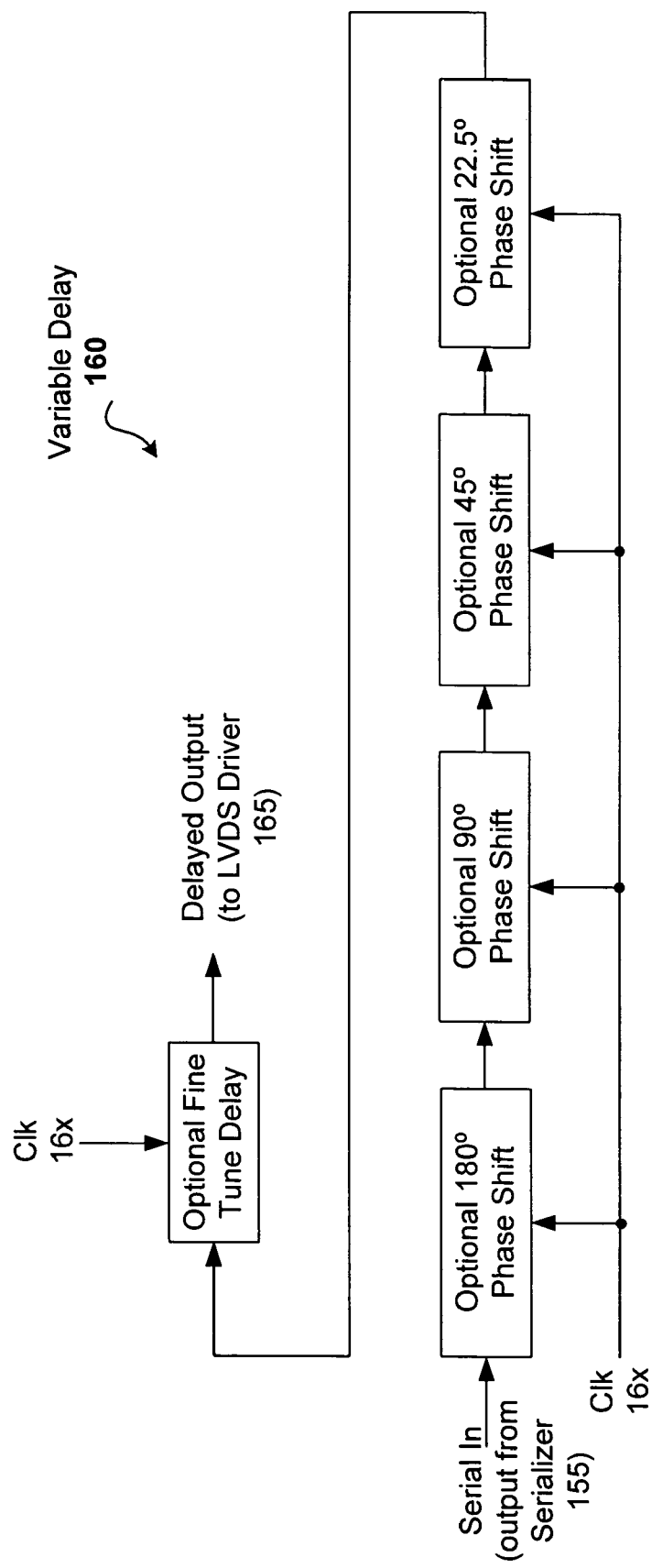

FIG. 2e illustrates one embodiment of the variable delay circuit 160, which enables the serial input and output streams of the FPA chip to be synchronized, by using minute increments of fine tuning delay. Each of the modules can be implemented with conventional technology. The serial input is received at the input of the variable delay 160. The serial input is then optionally delayed in increments of 180 degrees, 90 degrees, 45 degrees and 22.5 degrees using standard techniques and the clocks from clock recovery 145. In this particular embodiment, the 16× recovered clock is used. Also, an optional fine tune delay stage (e.g., 11.25 and/or 5.625 degree phase shifter) can be employed if so desired, to provide additional fine tuning of the delayed output.

Figure 2F:
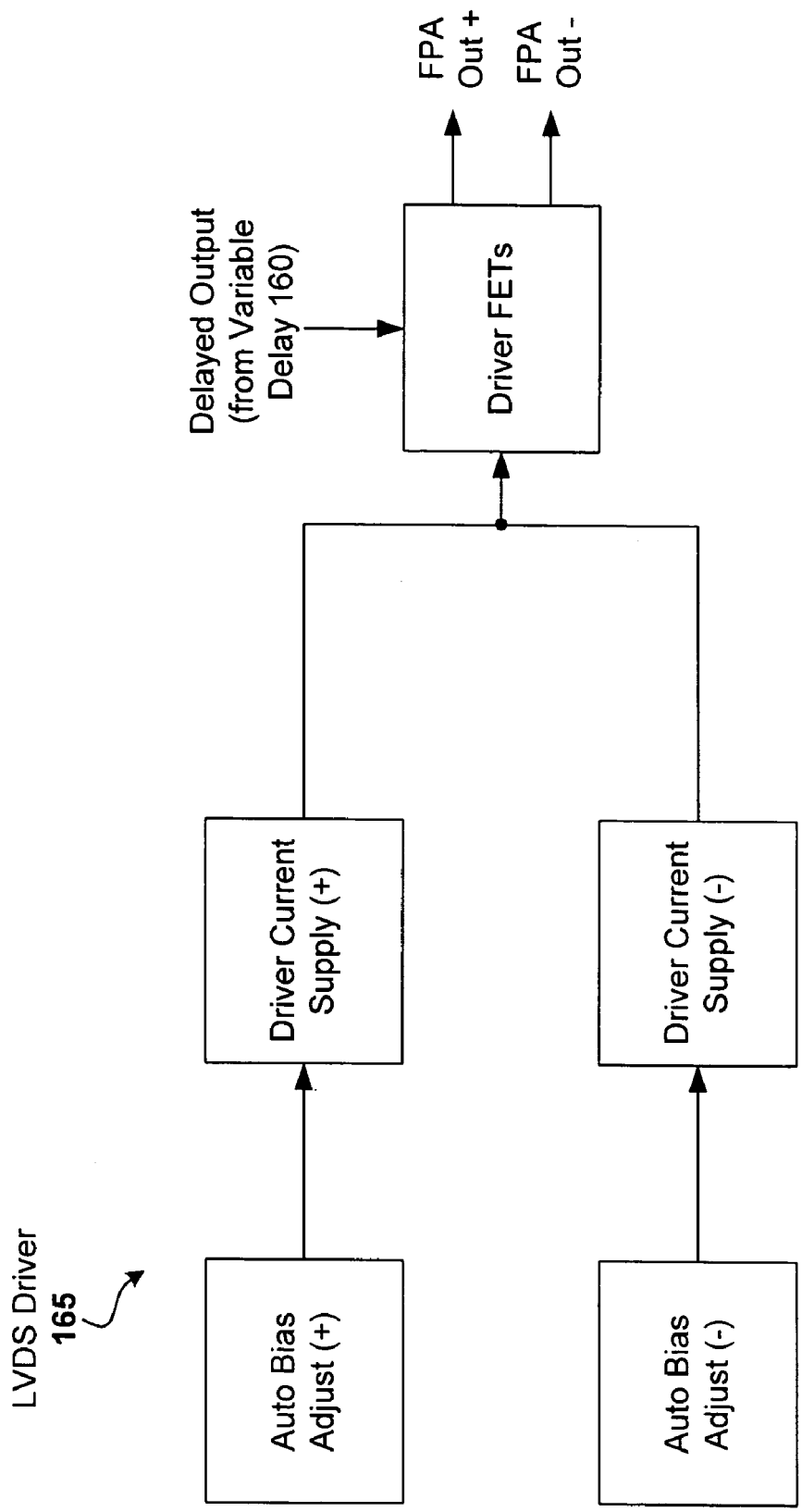

FIG. 2f illustrates one embodiment of the LVDS driver 165. The delay output from the variable delay 160 is received at conventional driver FET circuitry, which is configured to drive the differential output to the external load. The conventional + and − auto bias adjust modules and the + and − driver current supply modules are used to adjust the DC output levels and current levels to LVDS standards.

Methodology

Figure 3A:
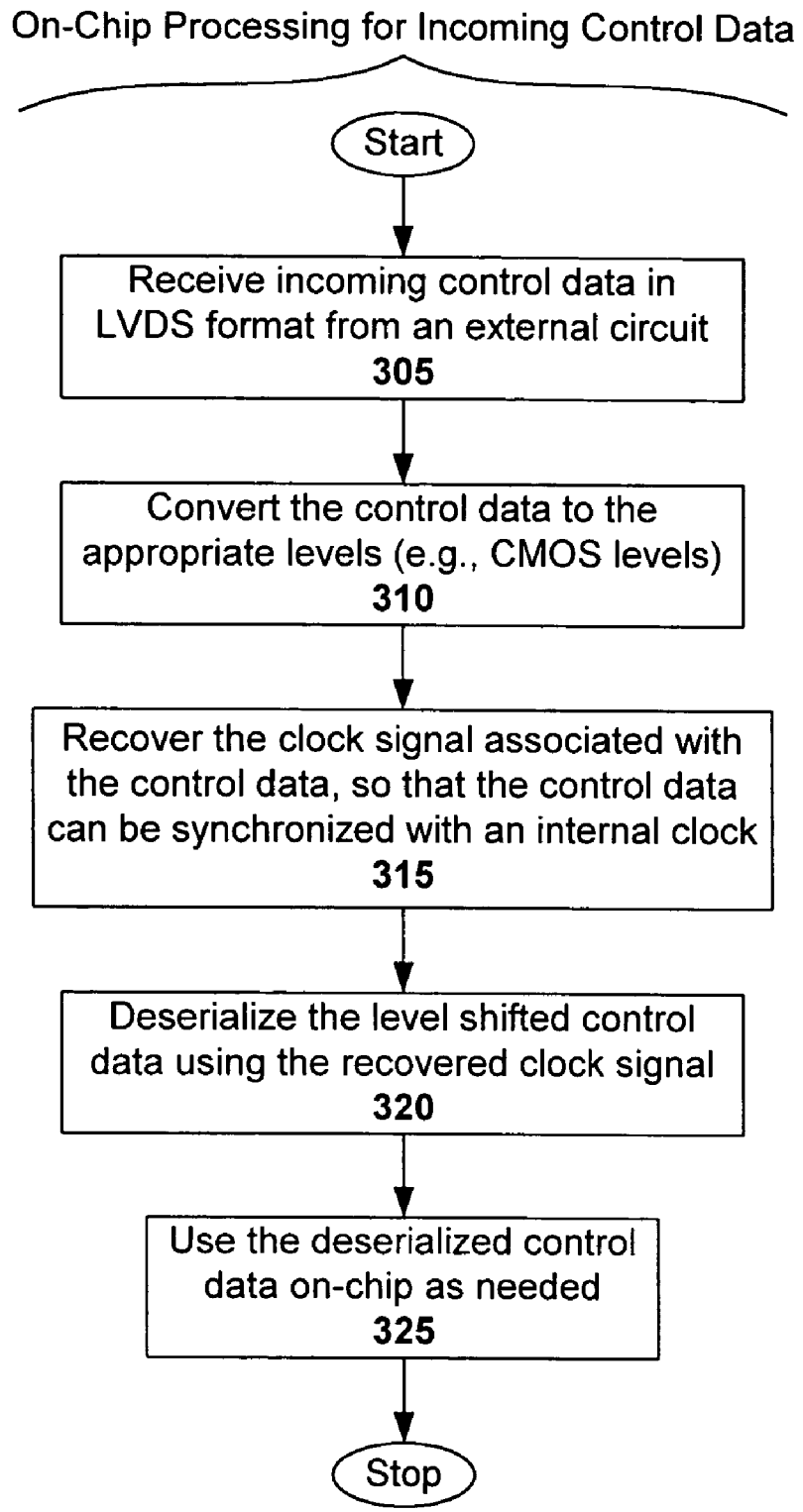
FIGS. 3a and 3b illustrate methods for interfacing a focal plane array using an on-chip low-voltage differential signal interface in accordance with one embodiment of the present invention.
Figure 3B:
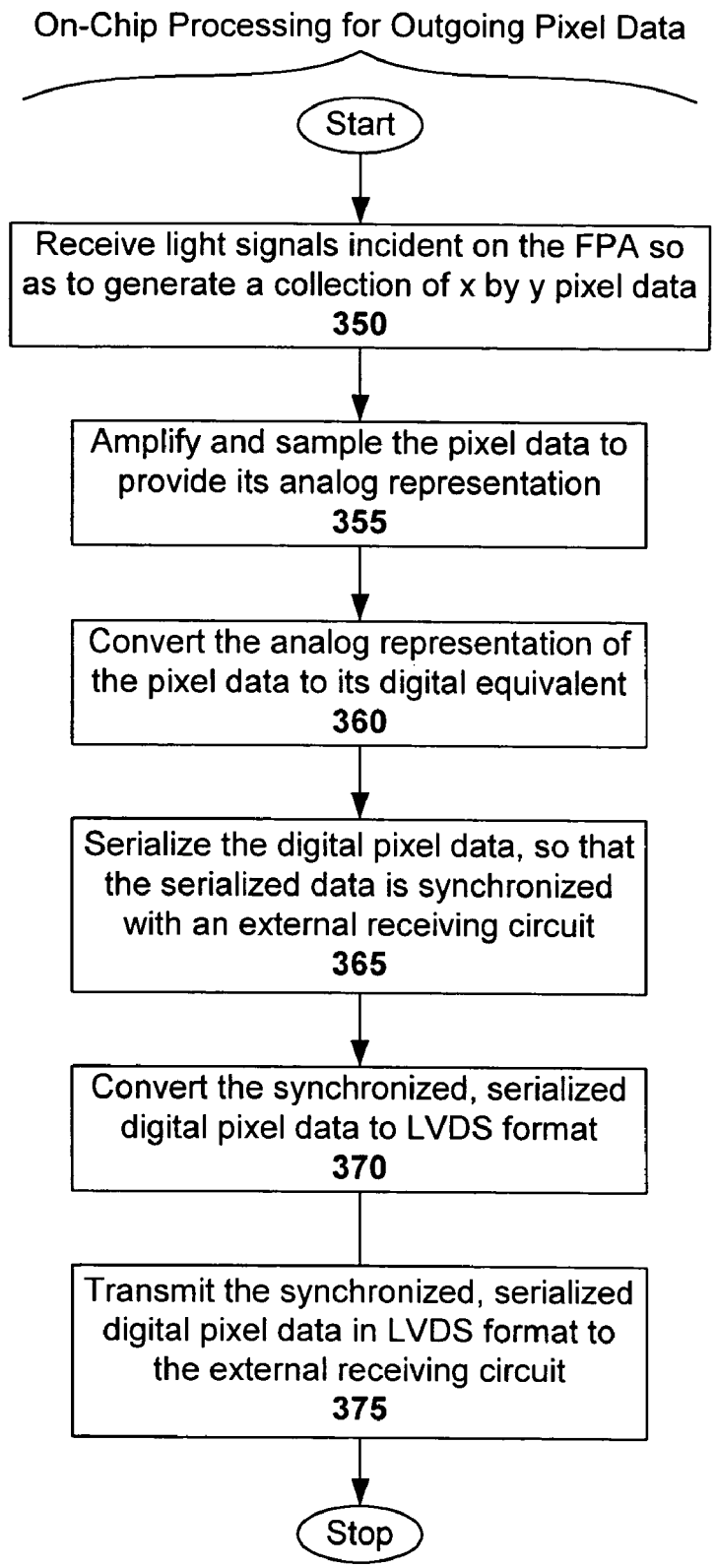

FIGS. 3a and 3b each illustrate an on-chip method for interfacing a focal plane array using an on-chip low-voltage differential signal interface in accordance with one embodiment of the present invention. In particular, FIG. 3a demonstrates on-chip processing for incoming control data, and FIG. 3b demonstrates on-chip processing for outgoing pixel data. The method can be carried out, for example, by the systems discussed in reference to FIGS. 1 and 2, which can be implemented, for example, as an ASIC or other purpose built semiconductor chip.

With regard to on-chip processing for incoming control data, the method includes with receiving 305 incoming control data in LVDS (low-voltage differential signal) format from an external circuit. An LVDS format generally includes any differential signal having levels between +/−5 VDC, with a voltage swing between high and low levels of less than 700 mVDC. In one particular embodiment, the LVDS high signal is about 1.4 VDC and an LVDS low signal is about 1.0 VDC. Note that other voltage levels can be used here as well, as will be apparent in light of this disclosure. The method continues with converting 310 the control data to the appropriate levels (e.g., CMOS levels), and recovering 315 the clock signal associated with the control data, so that the control data can be synchronized with an internal clock. The method proceeds with deserializing 320 the control data using the recovered clock signal. The method proceeds with using 325 the deserialized control data on-chip as needed (e.g., pixel readout, register loading, and other control functions).

With regard to on-chip processing for outgoing pixel data, the method includes receiving 350 light signals (e.g., IR) incident on the FPA so as to generate a collection of x by y pixel data. The method continues with amplifying and sampling 355 the pixel data to provide its analog representation. The method further includes converting 360 the analog representation of the pixel data to its digital equivalent, and serializing 365 the digital pixel data, so that the serialized digital data is synchronized with an external receiving circuit. The method proceeds with converting 370 the synchronized, serialized digital pixel data to LVDS format. The method continues with transmitting 375 the synchronized, serialized digital pixel data in LVDS format to the external receiving circuit.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A focal plane array chip device with an on-chip serial low-voltage differential signal (LVDS) interface, the device comprising:
    an LVDS receiver adapted to receive incoming control data in LVDS format from an external circuit, and to convert the control data to appropriate levels for subsequent use on the chip;
    a clock recovery circuit adapted to recover a clock signal associated with the control data, so that the control data can be synchronized with an internal clock;
    a deserializer module adapted to deserialize level shifted control data output by the LVDS receiver using the recovered clock signal;
    a command/decoder module adapted to receive the deserialized data so that the data can be used on-chip as needed; and
    an on-chip focal plane array adapted to receive light signals incident on the array so as to generate a collection of x by y pixel data.

2. The device of claim 1 further comprising:
    analog processing circuitry adapted to amplify and sample the pixel data to provide its analog representation; and
    an n-bit analog-to-digital converter adapted to convert the analog representation of the pixel data to its digital equivalent.

3. The chip device of claim 2 further comprising:
a serializer module adapted to serialize the digital pixel data;
a variable delay module adapted to synchronize the serialized digital pixel data with an external receiving circuit; and
an LVDS driver adapted to convert the synchronized, serialized digital pixel data to LVDS format, and to drive the synchronized, serialized digital pixel data in LVDS format to the external receiving circuit.

4. The chip device of claim 1 further comprising:
a serializer module adapted to serialize digitized pixel data generated by said on-chip focal plane array.

5. The chip device of claim 1 further comprising:
a variable delay module adapted to receive serialized digitized pixel data generated by said on-chip focal plane array, and to synchronize that data with an external receiving circuit.

6. The chip device of claim 1 further comprising:
an LVDS driver adapted to receive serialized, synchronized digitized pixel data generated by said on-chip focal plane array, and to drive the serialized, synchronized digital pixel data in LVDS format to the external receiving circuit.

7. The chip device of claim 1 wherein the chip device is implemented as an application specific integrated circuit chip.

8. The chip device of claim 1 wherein the LVDS format includes a differential signal having levels between about 0.2 VDC and 2.0 VDC.

9. A focal plane array chip device with an on-chip serial low-voltage differential signal (LVDS) interface, the device comprising:
a focal plane array adapted to receive light signals incident on the array so as to generate a collection of x by y pixel data;
a serializer module adapted to serialize a digital representation of the pixel data;
a variable delay module adapted to synchronize the serialized digital pixel data with an external receiving circuit; and
an LVDS driver adapted to convert the synchronized, serialized digital pixel data to LVDS format, and to drive the synchronized, serialized digital pixel data in LVDS format to the external receiving circuit.

10. The device of claim 9 further comprising:
analog processing circuitry adapted to amplify and sample the pixel data to provide its analog representation; and
an n-bit analog-to-digital converter adapted to convert the analog representation of the pixel data to the digital representation.

11. The device of claim 9 further comprising vertical address registers and horizontal address registers that allow pixel data to be selectively accessed.

12. The chip device of claim 9 further comprising:
an LVDS receiver adapted to receive incoming control data in LVDS format from an external circuit, and to convert the control data to appropriate levels for subsequent use on the chip.

13. The chip device of claim 9 further comprising:
a clock recovery circuit adapted to recover a clock signal associated with control data received from an external circuit, so that the control data can be synchronized with an internal clock of the chip.

14. The chip device of claim 13 further comprising:
a deserializer module adapted to deserialize the control data received from the external circuit, using the recovered clock signal.

15. The chip device of claim 9 further comprising:
a command/decoder module adapted to receive deserialized control data so that the data can be used on-chip as needed.

16. The chip device of claim 9 wherein the chip device is implemented as an application specific integrated circuit chip.

17. The chip device of claim 9 wherein the LVDS format includes a differential signal having levels between about 0.2 VDC and 2.0 VDC.

18. A method for interfacing a focal plane array chip using an on-chip serial low-voltage differential signal (LVDS) interface, the method comprising:
receiving incoming control data in LVDS format from off-chip;
converting the control data to appropriate levels for subsequent use on the chip;
recovering a clock signal associated with the control data, so that the control data can be synchronized with an internal clock;
deserializing the control data using the recovered clock signal, so that the data is available for on-chip use;
receiving light signals incident on an on-chip focal plane array so as to generate a collection of x by y pixel data;
serializing a digital representation of the pixel data;
synchronizing the serialized digital pixel data with an off-chip receiving circuit; and
converting the synchronized, serialized digital pixel data to LVDS format, for transmission to the off-chip circuit.

* * * * *